UNITED STATES PATENT OFFICE.

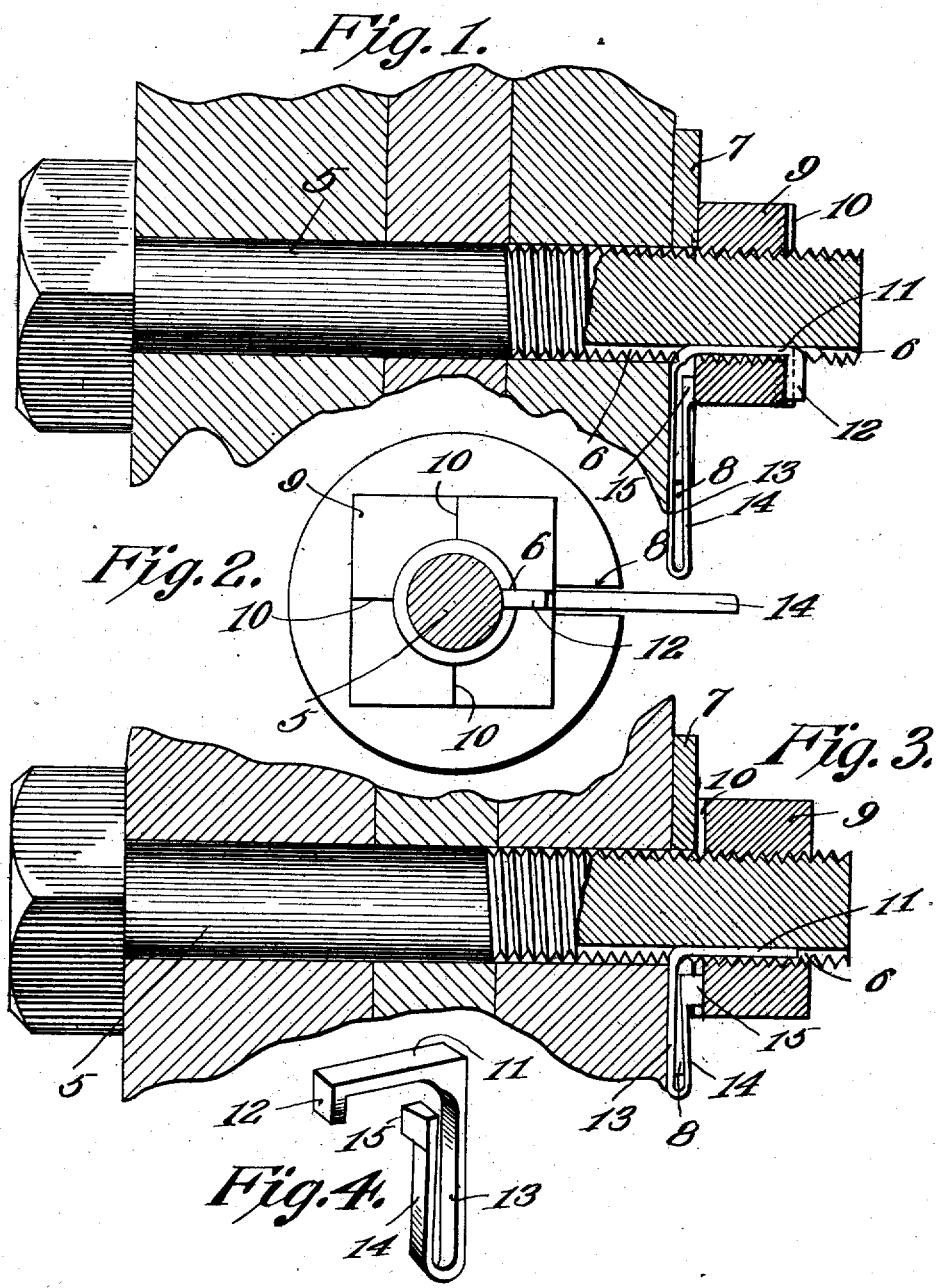

JAMES RHOADS, OF DUNLO, PENNSYLVANIA, ASSIGNOR OF ONE-HALF TO HARRY J. SAUL, OF DUNLO, PENNSYLVANIA.

NUT-LOCK.

989,192.  Specification of Letters Patent.  Patented Apr. 11, 1911.

Application filed September 29, 1910.  Serial No. 584,534.

*To all whom it may concern:*

Be it known that I, JAMES RHOADS, a citizen of the United States, residing at Dunlo, in the county of Cambria and State of Pennsylvania, have invented a new and useful Nut-Lock, of which the following is a specification.

It is the object of the present invention to provide an improved nut lock and the invention aims, among other things, to provide a device of this character which may be manipulated to permit of removal of the nut whenever desired, the device being adapted to be repeatedly used.

With the above objects and aims in view, the invention resides in the general construction and arrangement of parts shown in the accompanying drawings, in which, Figure 1 is a view partly in elevation and partly in longitudinal section of a nut lock structure constructed in accordance with the principles of the present invention. Fig. 2 is a front end view thereof, the bolt being shown in cross section. Fig. 3 is a view similar to Fig. 1 illustrating a slight modification of the invention. Fig. 4 is a perspective view of the locking pawl of the device.

In the drawings, there is shown a bolt 5 of the ordinary construction except that it is formed with a lengthwise extending groove 6 of greater depth than its threads. Fitted upon the bolt in the usual manner is a washer 7 formed with a radial slot 8 the function of which will be presently explained. Also, a nut 9 is threaded upon the bolt and is formed, in the instance of the form of the invention shown in Fig. 1 of the drawings, upon its outer or forward face with ratchet teeth 10.

In connection with the bolt, washer, and nut, there is provided a locking pawl which, in the form of the invention shown in Fig. 1 of the drawings, is formed from a resilient blank so formed up or bent as to form a portion indicated by the numeral 11 having a right angularly extending terminal 12. This portion 11 of the spring pawl seats in the groove 6 in the bolt 5 and the terminal 12 projects beyond the groove in position to coöperate with the teeth 10 of the nut. From the other end of the portion 11 of the spring pawl there projects a portion 13 extending substantially at right angles to the portion 11 in the same direction as the terminal portion 12 projects. This portion 13 has a resilient part 14 bent back upon it and formed at its end with a portion 15 bearing frictionally against the inner face of the nut 9. The portion 14 of course extends between the nut and the portion 13 and the resiliency of the portions 13 and 14 and of their bend serves to hold the extremity of the portion 14 against the inner face of the nut 9. It will be observed that the terminal 12 of the portion 11 bears against the outer face of the nut 9 and that as a consequence the pawl is held against movement outwardly in the groove 6 of the bolt.

The form of spring pawl shown in Fig. 3 of the drawings is identical with the form shown in Figs. 1 and 2 except that the terminal portion 12 is omitted and it is the inner face of the nut 9 that is formed with ratchet teeth 10. In this form of spring pawl the portion 15 coöperates with the teeth 10 of the nut.

What is claimed is:—

1. In a nut lock, a bolt formed with a groove, a washer fitted upon the bolt and formed with a radial slot registering with the groove in the bolt, a nut threaded upon the bolt and formed on one face with radial ratchet teeth, and a pawl having a portion seating in the groove in the bolt, a portion seating in the slot in the washer, and a portion coöperating with the ratchet teeth upon the nut face.

2. In a nut lock, a bolt formed with a groove, a washer fitted upon the bolt and formed with a radial slot registering with the groove in the bolt, a nut threaded upon the bolt and formed on one face with radial ratchet teeth, and a pawl formed from a resilient blank bent to form a portion seating in the groove in the bolt, a portion seating in the slot in the washer, and a yieldable portion coöperating with the ratchet teeth upon the nut face.

3. In a nut lock, a bolt formed with a groove, a washer fitted upon the bolt and formed with a radial slot registering with the groove in the bolt, a nut threaded upon the bolt and formed in one face with radial ratchet teeth, and a pawl having a portion seating in the groove in the bolt, a terminal portion coöperating with the teeth upon the nut, a portion seating in the slot in the washer, and a resilient portion bent back from the last mentioned portion and bearing at its ends against the plain face of the nut, the said nut being confined between the said end portions of the pawl.

In testimony that I claim the foregoing as my own, I have hereto affixed my signature in the presence of two witnesses.

JAMES RHOADS.

Witnesses:
  BERNARD GRATTON,
  W. R. GRUMLING.

Copies of this patent may be obtained for five cents each, by addressing the "Commissioner of Patents, Washington, D. C."

Correction in Letters Patent No. 989,192.

It is hereby certified that in Letters Patent No. 989,192, granted April 11, 1911, upon the application of James Rhoads, of Dunlo, Pennsylvania, for an improvement in "Nut-Locks," an error appears requiring correction as follows: In the grant and in the heading of the printed specification it is stated that said Rhoads assigned "one-half" of his right to Harry J. Saul, whereas it should have been stated that said Rhoads assigned *one-third of his right to said Harry J. Saul*, as shown by the records of assignments in this office; and that the said Letters Patent should be read with this correction therein that the same may conform to the record of the case in the Patent Office.

Signed and sealed this 16th day of May, A. D., 1911.

[SEAL.]

C. C. BILLINGS,
*Acting Commissioner of Patents.*